Patented Jan. 17, 1939

2,143,857

UNITED STATES PATENT OFFICE 2,143,857

PREPARATION OF ALKALI CELLULOSE

Edgar C. Britton and Walter J. Le Fevre, Midland, Mich., and Earl G. Hallonquist, Shelton, Wash., assignors to The Dow Chemical Company, Midland, Mich., a corporation of Michigan No Drawing. Application August 20, 1937, Serial No. 160,058

3 Claims. (Cl. 260—10)

This invention relates to an improvement in the manufacture of cellulose ethers and is particularly concerned with a process for the production of an alkali cellulose which can be etherified to form cellulose ethers having predetermined viscosity characteristics.

The customary methods for the manufacture of cellulose ethers result in the production of compounds, the viscosity of which in standard solutions cannot be estimated with any degree of accuracy until the final product has been isolated in purified form following the etherification reaction. For this reason most such processes are operated so as to yield high viscosity cellulose ethers. These ethers ordinarily are then subjected to a treatment intended to cause degradation of the material, resulting in the production of cellulose ethers, standard solutions of which have viscosities in the range desired. Such degradation has been accomplished ordinarily by exposing the ether to the action of an acid. This treatment has the disadvantage of forming ether products which are not stable if subjected to elevated temperatures, and films formed therefrom are brittle and generally unsatisfactory for many industrial applications.

Among the objects of the invention is to provide a process whereby a low viscosity alkali cellulose may be produced which will yield stable low viscosity cellulose ethers.

Reference hereinafter to the viscosity of cellulose is made with respect to a solution thereof in cuprammonium hydroxide. These solutions were uniformly prepared, employing the reagents recommended by the "committee on the viscosity of cellulose" of the American Chemical Society's Division of Cellulose Chemistry ("Industrial and Engineering Chemistry", Analytical Edition, vol. 1, page 49, (1929). The recommended cuprammonium hydroxide solution contained 30 grams of copper and 200 grams of ammonia per liter and was made up in the absence of air as recommended by Joyner (Journal of the Chemical Society, London, vol. 121, page 1511 (1922)). The concentration of the cellulose in cuprammonium hydroxide was selected to give a solution having a readily determined viscosity from which could be calculated viscosities for other concentrations according to the equation given by Kendall (Doree, "Methods of Cellulose Chemistry", D. Van Nostrand Co., Inc., New York, 1933, page 58). Viscosities of samples of alkali cellulose referred to herein were determined on 5 per cent solutions of the cellulose from carefully washed and dried samples thereof in the above-defined cuprammonium hydroxide reagent.

Reference to the viscosities of cellulose ether solutions is made herein with respect to 5 per cent solutions by weight of the particular ether concerned in a mixture of 80 parts of benzene and 20 parts of absolute ethyl alcohol by volume. The unit of viscosity herein employed is the poise.

We have now found that it is possible to control the viscosity of a cellulose ether product by means of a particular mode of preparation of the alkali cellulose employed in the manufacture of the ether. That is, we have found that cellulose ethers, capable of forming standard solutions having a viscosity in any desired range, may be produced by selecting the reaction conditions employed in the preparation of the alkali cellulose from which the ether is to be made. Our invention is based on the discoveries that the viscosity of a standard solution of ethyl cellulose varies directly as the viscosity of the cellulose from which the ether was prepared, and that the viscosity of cellulose can be modified readily by varying the time and temperature employed while preparing the alkali cellulose for etherification, i. e. while mixing, grinding, or shredding the same. We have found in general that, all other conditions of alkali cellulose preparation and etherification being constant, the viscosity of the cellulose ether decreases rapidly corresponding to an increase of the temperature employed during shredding or homogenizing operations carried out on the alkali cellulose from which the ether is made. We have also found that, all other conditions of alkali cellulose preparation and etherification being constant, a decrease in cellulose viscosity occurs as the time employed in mixing, grinding, or shredding the alkali cellulose is increased. The term "shredding" will be employed hereinafter to describe any suitable mixing, grinding, or physical disintegrating process carried out on a cellulose, alkali, and water mixture or on a pre-formed alkali cellulose, to effect desired changes therein while practicing our invention.

In order to eliminate from our experimental work variables which might affect the viscosity of the finished product, we have uniformly employed the following conditions. A commercially available cellulose pulp or linters of high alpha cellulose content was immersed in 50 per cent aqueous sodium hydroxide solution, the period of immersion being uniform for all preparations of the same series. (We consider 50 per cent alkali solutions to be the lowest practical concentration from which an alkali cellulose may be prepared capable of forming ether products which are soluble in the usual organic solvents and which will yield strong pliable films. Less highly substituted cellulose ethers, which are in consequence less soluble than those mentioned above, may be prepared from an alkali cellulose formed by treating a cellulosic material with an alkali solution less concentrated than 50 per cent.) The so-formed alkali cellulose was mixed with further quantities of solid alkali by grinding or shredding, so that the proportions of alkali and water in the alkali cellulose corresponded in proportion to alkali solutions of about 50 to 80 per cent concentration. The effect of temperature of shredding was studied by shredding all members of one series of preparations for a given length of time, varying the temperature from batch to batch. The effect of time of shredding was studied by maintaining the temperature constant in all batches of a given series, while shredding each batch for a different length of time. The shredded product was subjected to etherification, either with or without an aging period between the shredding and the etherification, but in all determinations made on a given series, the conditions of aging, if any, were constant. The etherification of the shredded alkali cellulose was carried out in the presence of an excess of ethyl chloride at a temperature of 115° C. for a period of 8 hours. The ether product was recovered and dried under uniform conditions and its viscosity in a standard benzene-ethanol solution was determined as described above.

The following table illustrates the effect of alkali cellulose shredding temperature, both on the viscosity of the cellulose in the alkali cellulose, and of ethyl cellulose formed therefrom. The cellulosic material employed in this instance was a loblolly pine pulp, which in the untreated form had a viscosity of 225 poises in the cuprammonium hydroxide solution described above. 200 grams of this pulp was mixed with 240 grams of 50 per cent sodium hydroxide solution in a shredder and mixed for 10 minutes. To the mixture was added 280 grams of flaked sodium hydroxide and the mixture was shredded for 2½ hours longer at the temperature indicated in the table. The shredded product had an alkali:cellulose ratio of 2.08:1 and a water:cellulose ratio of 0.902:1. This product was allowed to stand at 25° C. for 24 hours before being ethylated.

In all of the following tables, column A is the number of the particular experiment; B indicates the temperature, in degrees C., employed in shredding; column C records the viscosity of the cellulose in the shredded alkali cellulose; column D shows the alkali:cellulose ratio in each batch; column E records the water:cellulose ratio; F indicates the per cent of the sodium hydroxide present in the alkali cellulose which reacted with ethyl chloride in the etherification reaction; G is the viscosity of a standard solution of the ethyl cellulose obtained; and H shows the ethoxyl content of the ethyl cellulose product.

| A | B | C | D | E | F | G | H |
|---|---|---|---|---|---|---|---|
| 1 | 4 | 45.0 | 2.12 | 0.85 | 92.5 | 0.916 | 50.3 |
| 2 | 11 | 34.0 | 2.04 | 0.86 | 93.0 | 1.075 | 52.3 |
| 3 | 25 | 20.0 | 2.03 | 0.93 | 97.0 | 1.010 | 49.2 |
| 4 | 50 | 3.5 | 2.03 | 0.91 | 98.0 | 0.542 | 47.0 |
| 5 | 50 | 3.5 | 2.03 | 0.91 | 98.0 | 0.542 | 47.0 |
| 6 | 50 | 3.5 | 2.02 | 0.93 | 97.5 | 0.430 | 46.9 |

It is noted in the above table that, all other conditions being constant in the preparation of alkali cellulose and in its etherification, the shredding temperature is intimately related to the viscosities of both the cellulose in the alkali cellulose and the ether formed therefrom. The viscosity difference between samples of alkali cellulose, each of which is shredded at a temperature below room temperature (about 25° C.), is not as great as the difference noted between viscosities of samples shredded at temperatures above room temperature, the temperature increment between shredding conditions below and above room temperature being the same. We therefore consider batches shredded at temperatures below about 20° to 25° C. as "blank" or "control" batches and compare the viscosities of samples shredded at higher temperatures with such controls.

An alkali cellulose of somewhat lower alkali and higher water content, prepared from the same pulp employed in the examples of the preceding table, but which was not subjected to aging after being shredded, was ethylated in the same manner as was employed in the preceding examples. The results are given in Table II:

| A | B | C | D | E | F | G | H |
|---|---|---|---|---|---|---|---|
| 1 | 10 | 60 (approx.) | 2.12 | 1.75 | 96.5 | 1.850 | 44.0 |
| 2 | 35 | 10 (approx.) | 2.05 | 1.70 | 98.0 | 0.224 | 42.5 |

A similarly treated alkali cellulose prepared from another commercially available pulp, the original viscosity of which in untreated condition was approximately 1000 poises, was shredded for 2½ hours without having been subjected to aging and was ethylated under the conditions employed in all of the foregoing examples. The results are given in Table III:

| A | B | C | D | E | F | G | H |
|---|---|---|---|---|---|---|---|
| 1 | 10 | 200 | 2.01 | 1.99 | 98.0 | 3.830 | 45.7 |
| 2 | 50 | 5 | 2.01 | 1.99 | 86.0 | 0.785 | 47.0 |

The foregoing examples have shown the effect of shredding an alkali cellulose at temperatures up to about 50° C. We have found that considerably higher temperatures may be used to advantage, i. e. up to about 120° C., the temperature ordinarily employed in etherification.

An alkali cellulose which had been prepared by passing a sheet of cellulosic fibers into and through a bath of 77 per cent aqueous sodium hydroxide solution at 106° C. at a rate of 16 feet per minute was shredded for 15 minutes in a jacketed shredder, the jacket temperature being held at 80° C. by circulating hot water at that temperature therethrough. Shredding was continued for an additional 5 minutes while water at 50° C. was circulated through the shredder jacket. The viscosity of the cellulose in the alkali cellulose prior to shredding, when determined in a 3 per cent solution thereof in the standard cuprammonium hydroxide reagent previously defined, was 1.53 poises. A similar viscosity determination conducted on the shredded product gave a value of 0.283 poise. Etherification of this product with an excess of ethyl chloride at a temperature of about 120° C. yielded an ethyl cellulose having a viscosity of about 0.5 poise.

We have studied the effect of varying the time of shredding, while holding all other factors constant, and have discovered that in series of determinations carried out at any of the temperatures employed in the three preceding tables while varying the shredding time from approximately 10 minutes to several hours, e. g. 8 to 10 hours, the viscosity of the cellulose in the alkali cellulose and the viscosity of the ether products formed therefrom decreases as the time of shredding increases. We have ordinarily found it more convenient, and to be productive of more uniformly shredded product, to shred the alkali cellulose for about 2½ hours, while adjusting the temperature so as to produce a finished product having the desired viscosity.

During the etherification of an alkali cellulose, the reaction between the etherifying agent and the alkali cellulose proceeds as a surface reaction until all of the cellulosic materials are in solution. If agitation is applied to the reactor during etherification, heat is transferred from the liquid reagents uniformly throughout the mass of the solid cellulosic substances present. This step can be integrally tied in with our invention by effecting preliminary viscosity reduction on an alkali cellulose, while grinding or shredding the same and continuing the viscosity reduction in the etherifying vessel during the preliminary stages of the etherification reaction.

Although we have illustrated various modes of practicing our invention by reference to ethyl cellulose, we have found that the process is equally applicable to the production from alkali cellulose of other cellulose ethers whether alkyl, aralkyl, or mixed alkyl and/or aralkyl ethers, e. g. methyl, propyl, butyl, ethyl butyl, benzyl, ethyl benzyl cellulose, etc., the viscosity of the ether varying directly as the viscosity of the cellulose in the alkali cellulose from which it is prepared. In every instance the cellulose ether formed from our alkali cellulose is more stable than an ether of the same viscosity prepared by acid hydrolysis of a high viscosity ether.

The invention has been illustrated primarily with reference to the preparation of a soda cellulose having certain preferred properties, but it is equally applicable to the preparation of potash cellulose in an analogous manner.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:

1. In a process for the preparation of an alkali cellulose, adapted to the production of ethyl cellulose having a viscosity in the range from about 0.15 to about 2.0 poises, the step which consists in shredding a mixture of alkali, cellulose, and water, wherein the alkali and water correspond in proportion to a 50 to 80 per cent alkali solution, at a temperature above room temperature and below about 120° C., for a period of from about 0.25 to about 10 hours, to effect a reduction of the intrinsic viscosity of the cellulose.

2. The process which consists in mixing sodium hydroxide, water, and a cellulose whose viscosity is between about 200 and about 1000 poises, in which mixture the sodium hydroxide and water correspond in proportion to an aqueous sodium hydroxide solution of between about 50 and about 80 per cent concentration, and shredding said mixture at a temperature above room temperature and below about 120° C. for a period of from about 0.25 to about 10 hours, to produce an alkali cellulose having a viscosity less than 10 poises.

3. The process which consists in preparing a mixture of sodium hydroxide, cellulose, and water, wherein the sodium hydroxide and water correspond in proportion to a 50 to 80 per cent sodium hydroxide solution, and wherein the cellulose had an original viscosity between about 200 and about 1000 poises, and shredding said mixture at a temperature between about 25° C. and about 50° C. for a period of about 2.5 hours, to prepare a uniform, low viscosity alkali cellulose adapted to the production of ethyl cellulose having a viscosity in the range from about 0.15 to about 2.0 poises.

EDGAR C. BRITTON.
WALTER J. LE FEVRE.
EARL G. HALLONQUIST.